United States Patent
Tabuchi et al.

[11] Patent Number: 5,831,661
[45] Date of Patent: Nov. 3, 1998

[54] MARKING SHEET HAVING PRESCRIBED AREAS REMOVED BY IRRADIATION

[75] Inventors: Yasuo Tabuchi, Anjo; Junichi Ohguchi, Toyoake; Fumio Tanimoto, Yokkaichi, all of Japan

[73] Assignee: Nippondenso Co., Ltd., Japan

[21] Appl. No.: 555,070

[22] Filed: Nov. 8, 1995

[30] Foreign Application Priority Data

Nov. 10, 1994 [JP] Japan .................................. 6-276787

[51] Int. Cl.$^6$ ...................................................... B41J 2/47
[52] U.S. Cl. ............................................................ 347/262
[58] Field of Search ................................... 347/262, 264, 347/221, 139; 346/135.1; 369/283, 284, 286

[56] References Cited

U.S. PATENT DOCUMENTS

| | | | |
|---|---|---|---|
| 5,210,064 | 5/1993 | Shon Baker et al. | 427/150 |
| 5,428,599 | 6/1995 | Yashima et al. | 369/283 |
| 5,479,394 | 12/1995 | Yashima et al. | 369/272 |

FOREIGN PATENT DOCUMENTS

| | | |
|---|---|---|
| 62-203691 | 9/1987 | Japan . |
| 62-203692 | 9/1987 | Japan . |
| 5-37753 | 6/1993 | Japan . |

*Primary Examiner*—Mark J. Reinhart
*Attorney, Agent, or Firm*—Cushman Darby & Cushman Intellectual Property Group of Pillsbury Madison & Sutro, LLP

[57] ABSTRACT

A transparent adhesive layer 3 with good permeability to laser light is provided on a base sheet 4, a colored layer 2 with good absorption of laser light is provided on the transparent adhesive layer 3, and a transparent layer 1 with good permeability to laser light is provided on the colored layer 2. Laser light 6 is irradiated from the side of the transparent layer 1 to form marked sections 5 at prescribed areas of the colored layer 2. To paste the marking sheet A onto the outer surface of a product, the base sheet 4 is peeled off and the transparent adhesive layer 3 is pasted onto the outer surface of the product. The color of the outer surface of the product may then be seen through the marked sections 5. Thus, satisfactory displays may be provided using only the marked sections 5 formed by laser light irradiation, without any additional special painting step.

9 Claims, 2 Drawing Sheets

MARKING SHEET HAVING PRESCRIBED AREAS REMOVED BY IRRADIATION

BACKGROUND OF THE INVENTION

1. Field of the Invention

The present invention relates to a laser marking method and marking sheets on which marked sections are formed by irradiation with laser light to make letters, symbols, drawings and the like, and which is suitable for application to name plates which are pasted on the outer surface of automobile parts, for example, to display the part number, production date, trademark, etc.

2. Description of the Related Art

A conventional laser marking method of this type has been proposed in Japanese Examined Patent Publication No. 5-37753, and in the method described therein, one surface of a transparent substrate is covered with a first colored layer having a higher laser light absorbance than the substrate, and laser light is irradiated from the other surface of the substrate to cause thermal expansion and elimination of sections of a desired shape on the first colored layer, thus forming marked sections.

Also, a second colored layer with a different color tone is formed over the first colored layer, so that the second colored layer color coats the marked sections having the desired shape.

However, since the formation of the marked sections by this prior art technique requires formation of a second colored layer with a different color tone after formation of the marked sections with the desired shape on the first colored layer by laser light irradiation, a special step (coating step) must be established for formation of the second colored layer, thus creating a problem of higher production cost.

SUMMARY OF THE INVENTION

It is an object of the present invention, which has been accomplished in light of these considerations, to allow displaying of marked sections using the color of the outer surface of the product itself, without formation of a second colored layer having a different color tone.

In order to achieve this object, the present invention employs the following technical means.

According to the invention, the laser marking method is characterized in that a marking sheet comprising at least:

an adhesive layer (3,30), a coating sheet layer (4) provided in a peelable manner on one side of the adhesive layer (3,30), and a colored layer (2) with good absorption of laser light (6), which is provided on the other side of the adhesive layer (3,30), is irradiated with laser light (6) to remove prescribed areas of the colored layer (2) and thus form marked sections (5).

According to another embodiment of the invention, the laser marking method is characterized in that a marking sheet comprising:

a transparent adhesive layer (3) with good permeability to laser light (6), a coating sheet layer (4) provided in a peelable manner on one side of the transparent adhesive layer (3), a colored layer (2) with good absorption of laser light (6), which is provided on the other side of the transparent adhesive layer (3), and a transparent layer (1) with good permeability to laser light (6), which is provided on the colored layer (2), is irradiated with laser light (6) to remove prescribed areas of the colored layer (2) and thus form marked sections (5).

According to another embodiment of the invention, the laser marking method is characterized in that a marking sheet comprising:

a transparent adhesive layer (3) with good permeability to laser light (6), a coating sheet layer (4) provided in a peelable manner on one side of the transparent adhesive layer (3), a transparent layer (1) with good permeability to laser light (6), which is provided on the other side of the transparent adhesive layer (3), and a colored layer (2) with good absorption of laser light (6), which is provided on the transparent layer (1), is irradiated with laser light (6) to remove prescribed areas of the colored layer (2) and thus form marked sections (5).

According to another embodiment of the invention, the laser marking method is characterized in that a marking sheet comprising:

a colored adhesive layer (30) with good absorption of laser light (6), a coating sheet layer (4) provided in a peelable manner on one side of the colored adhesive layer (30), a colored layer (2) with good absorption of laser light (6), which is provided on the other side of the colored adhesive layer (30), and a transparent layer (1) with good permeability to laser light (6), which is provided on the colored layer (2), is irradiated with laser light (6) to remove prescribed areas of the colored layer (2) and the colored adhesive layer (30) and thus form marked sections (5).

According to another embodiment of the invention, a marking sheet is characterized by comprising at least:

an adhesive layer (3,30), a coating sheet layer (4) provided in a peelable manner on one side of the adhesive layer (3,30), and a colored layer (2) with good absorption of laser light (6), which is provided on the other side of the adhesive layer (3,30), and by having marked sections (5) formed on the colored layer (2) by removal of prescribed areas by irradiation with laser light (6).

According to another embodiment of the invention, a marking sheet is characterized by comprising:

a transparent adhesive layer (3) with good permeability to laser light (6), a coating sheet layer (4) provided in a peelable manner on one side of the transparent adhesive layer (3), a colored layer (2) with good absorption of laser light (6), which is provided on the other side of the transparent adhesive layer (3), and a transparent layer (1) with good permeability to laser light (6), which is provided on the colored layer (2), and by having marked sections (5) formed on the colored layer (2) by removal of prescribed areas by irradiation with laser light (6).

According to another embodiment of the invention, a marking sheet is characterized by comprising:

a transparent adhesive layer (3) with good permeability to laser light (6), a coating sheet layer (4) provided in a peelable manner on one side of the transparent adhesive layer (3), a transparent layer (1) with good permeability to laser light (6), which is provided on the other side of the transparent adhesive layer (3), and a colored layer (2) with good absorption of laser light (6), which is provided on the transparent layer (1), and by having marked sections (5) formed on the colored layer (2) by removal of prescribed areas by irradiation with laser light (6).

According to another embodiment of the invention, a marking sheet is characterized by comprising:

a colored adhesive layer (30) with good absorption of laser light (6), a coating sheet layer (4) provided in a peelable manner on one side of the colored adhesive layer (30), a colored layer (2) with good absorption of laser light (6), which is provided on the other side of the colored adhesive layer (30), and a transparent layer (1) with good permeability to laser light (6), which is provided on the colored layer (2), and by having marked sections (5) formed on the colored layer (2) and the colored adhesive layer (30) by removal of prescribed areas by irradiation with laser light (6).

According to another embodiment of the invention, a marking sheet-equipped product is characterized in that the coating sheet layer (4) of the marking sheet described in any one of claims 5 to 8 is peeled from the adhesive layer (3, 30) and the marking sheet is pasted on the outer surface (7) of the product via the adhesive layer (3, 30), in such a manner that the color of the outer surface (7) of the product may be seen through the marked sections (5).

The numerals in parentheses given for each of the means described above correspond to the specific means described in the examples which follow.

DESCRIPTION OF THE PREFERRED EMBODIMENTS

Figure 1:
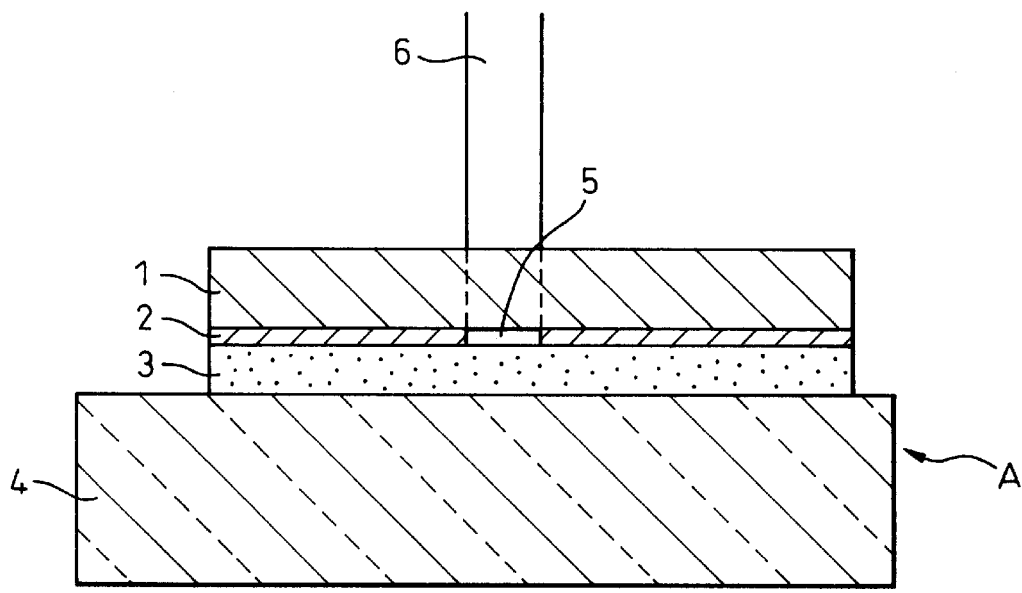
FIG. 1 is a sectional view of the first embodiment of the present invention.

The aforementioned technical means employed according to the invention make it possible to provide a construction whereby marked portions are displayed by contrast between the color of the colored layer and the color of the outer surface of the product, and consequently the marked sections may be displayed satisfactorily using the color of the outer surface of the product itself, by simply forming marked sections with irradiation of laser light on a marking sheet which has a simple construction, without the need for a second colored layer having a different color tone as according to the prior art. As a result, the laser marking may be performed at a lower cost, providing a considerable effect in terms of practicality.

Since the marked sections may be displayed using the color of the outer surface of the product itself, there is also no need whatsoever to paint the product with a special color. Furthermore, the laser marking procedure according to present invention is easier than direct laser marking on products, since it allows formation of marked sections by irradiation of laser light onto small marking sheets.

In addition to the effects mentioned above, the invention can provide protection for the colored layer since the transparent layer prevents undesirable occurrences such as separation of the colored layer from the marked sections when external force is directly applied to the colored layer.

Furthermore, since the invention can have a non-heat-generating transparent layer between the colored layer which generates heat upon laser light irradiation and the transparent adhesive layer, heat transfer from the colored layer to the adhesive layer during the laser light irradiation is kept to a minimum. Consequently, the adhesive strength of the adhesive layer is not impaired by rising temperature.

Furthermore, in an embodiment, the invention a colored acrylic adhesive agent with good absorption of laser light for the adhesive layer, and the marked sections are formed when laser light is irradiated thereon to cause generation of heat in and removal of prescribed areas on both the colored layer and the colored adhesive layer; thus when the coating sheet layer is peeled off from the colored adhesive layer and the marking sheet is adhered and fixed onto the outer surface of a product through the adhesive layer, the color of the outer surface of the product is seen as it passes through only the transparent layer from the marked sections, and this allows the color of the outer surface of the product to be seen more clearly.

The present invention will now be explained by way of the following examples which are illustrated in the drawings.

First Embodiment

FIG. 1 shows the cross-sectional construction of a marking sheet A used in the method of the present invention, wherein a transparent layer 1 is made of a thin film with a prescribed thickness (about 50 $\mu$m) from a transparent substrate with good permeability to laser light, such as a polyester film. A colored layer 2 made of a vapor-deposited aluminum layer is integrally formed on the surface of one side of the transparent layer 1 by vapor deposition. The colored layer 2 has good absorption of laser light.

Here, since the vapor deposited aluminum layer displays a silver color, when the color of the colored layer 2 is desired to be a color other than silver, a color printed layer with an appropriate color may be formed by an acrylic coating on the vapor deposited aluminum layer. Thus, the colored layer 2 is not limited to having a construction with a single vapor deposited aluminum layer, but may have a multiple layer construction.

A transparent adhesive layer 3 is adhered onto the surface of one side of the colored layer 2, and it is made of a transparent adhesive agent such as an acrylic adhesive, and has good permeability to laser light.

A base sheet 4 performs the function of a coating sheet layer (separator) which coats the side of the transparent adhesive layer 3 opposite the colored layer 2, and on the surface of the base sheet 4 there is formed a transparent coating layer of a nature which does not adhere to the transparent adhesive layer 3, by which the base sheet 4 may be easily peeled off from the transparent adhesive layer 3. The material used for the base sheet 4 may be, for example, silicon-impregnated paper.

The marking sheet A shown in FIG. 1 for this embodiment is used as a name plate which is pasted onto the outer surface of an automobile part, and marked sections 5 are formed to display the company name, trademark, product name, part number, production date, etc. The marked sections 5 form a combination of letters, symbols or drawings.

As for the method of forming the marked sections 5, the marking sheet A constructed as shown in FIG. 1 is irradiated with laser light 6 from the transparent layer 1 side onto prescribed areas which are to form the marked sections 5. The irradiation with laser light 6 generates heat in the prescribed areas of the colored layer 2 to remove them and thus form the marked sections 5.

The laser light 6 used here is of a nature which is absorbed by the colored portions but which is not absorbed by and thus passes through the transparent portions, and specifically a yttrium-aluminum garnet laser (YAG laser) may be used.

Thus, since the laser light 6 passes through the transparent layer 1 and the transparent adhesive layer 3, heat is not generated in the transparent layer 1 and the transparent adhesive layer 3 and hence they are not affected by irradiation with the laser light 6.

The laser light 6 which reaches the base sheet 4 is absorbed by the colored layer 2 where it is attenuated, and since it arrives after having passed through the transparent layer 1 and the transparent adhesive layer 3, the attenuation is considerable and thus even if the base sheet 4 is colored, little heat is generated therein. There is, of course, no heat generation if the base sheet 4 is constructed of a transparent material.

Figure 2:
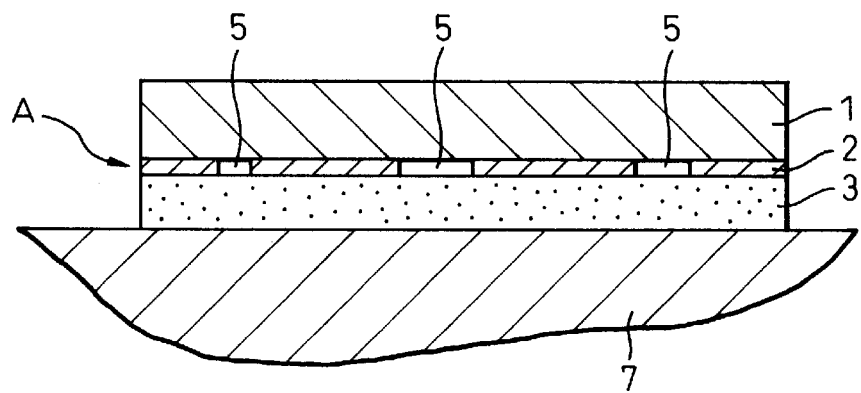
FIG. 2 is a sectional view of the marking sheet of the first embodiment which has been pasted onto the outer surface of a product.

FIG. 2 shows the marking sheet A with marked sections 5, which has been pasted on the outer surface of a product 7, wherein the base sheet 4 has been peeled off from the adhesive layer 3 and the marking sheet A has been adhered and fixed onto the outer surface of the product 7 through the adhesive layer 3.

When the marking sheet A is pasted onto the outer surface of the product 7, the color of the outer surface of the product 7, for example the color of the hub of a magnetic clutch for the compressor of an automobile air conditioner (the rotator connected to the rotating shaft of the compressor), i.e. the black color of the paint applied to the outer surface of the iron hub, can be seen through the marked sections 5 of the colored layer 2 as it passes through the transparent adhesive layer 3 and the adhesive layer 1, allowing the letters, drawings and symbols of the marked sections 5 to become readable by the contrast between the colors of the colored layer 2 and the outer surface of the product 7.

Consequently, the color of the colored layer 2 is preferably selected so as to have a high contrast with the color of the outer surface of the product 7.

Furthermore, the transparent layer 1 provides protection for the colored layer 2 by preventing undesirable occurrences such as separation of the colored layer 2 from the marked sections 5 when external force is directly applied to the colored layer 2.

Second Embodiment

Figure 3:
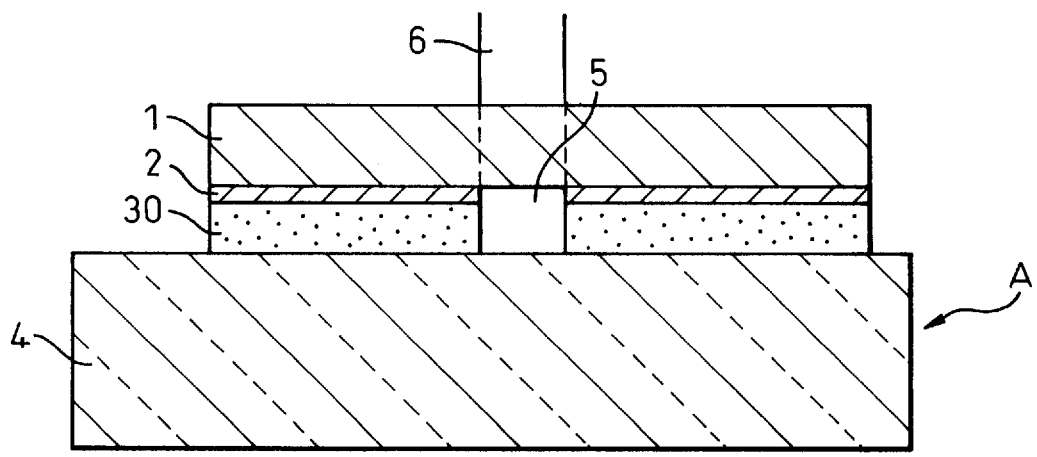
FIG. 3 is a sectional view of the second embodiment of the present invention.

In this embodiment, as shown in FIG. 3, a colored acrylic adhesive agent with good absorption of laser light 6 is used as the adhesive layer 30, and marked sections 5 are formed when laser light 6 is irradiated thereon to cause generation of heat in and removal of prescribed areas on both the colored layer 2 and the colored adhesive layer 30.

Thus, when the base sheet 4 is peeled off from the colored adhesive layer 30 and the marking sheet A is adhered and fixed onto the outer surface of a product 7 through the adhesive layer 30, the color of the outer surface of the product 7 is seen as it passes through only the transparent layer 1 from the marked sections 5, and this allows the color of the outer surface of the product 7 to be seen more clearly.

Third Embodiment

Figure 4:
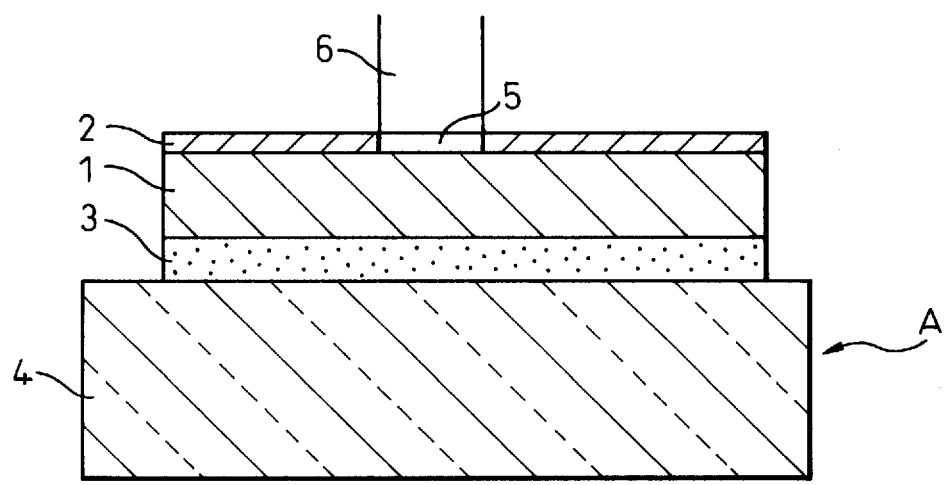
FIG. 4 is a sectional view of the third embodiment of the present invention.

In this embodiment, as shown in FIG. 4, the layered positions of the colored layer 2 and the transparent layer 1 have been reversed, placing the colored layer 2 on the outermost side, while the transparent layer 1 lies in the intermediate position.

With this type of layered structure, the non-heat-generating transparent layer 1 lies between the colored layer 2 which generates heat upon irradiation with laser light 6 and the transparent adhesive layer 3, and therefore heat transfer from the colored layer 2 to the adhesive layer 3 during irradiation with the laser light 6 is kept to a minimum. Consequently, the adhesive strength of the adhesive layer 3 is not impaired by rising temperature.

As a result, the adhesive strength of the adhesive layer 3 is adequately maintained even after laser light irradiation, allowing the marking sheet A to be fastly adhered and fixed onto the outer surface of the product 7.

Furthermore, since in this example the colored layer 2 is placed on the outermost side and the transparent layer 1 lies in the intermediate position, the colored layer 2 is reinforced from the backside by the transparent layer 1, thus helping to prevent deformity and cracking of the colored layer 2.

In all of the first to third embodiments described above, the laser light 6 is irradiated from the side opposite the base sheet 4, but if the base sheet 4 is formed of a transparent material (transparent film) with good permeability to laser light 6, the laser light 6 may be irradiated from the side of the base sheet 4.

Also, in the embodiments described above no reference has been made to the degree of transparency of the transparent layer 1 or the transparent adhesive layer 3, since they may even be semi-transparent having a slightly low transparency, so long as it is adequate enough for the laser light to pass through during the laser light irradiation and for the color of the outer surface of the product 7 to be seen.

What is claimed is:

1. A laser marking method, comprising:

providing a marking sheet including an adhesive layer, and a colored layer with good absorption of laser light, irradiating said marking sheet with laser light to remove prescribed areas of said colored layer to thereby form marked sections, providing a product, a color of an outer surface of said product being different than a color of said colored layer, and securing said marking sheet to said outer surface of said product via said adhesive layer, whereby said color of said outer surface can be seen at said marked sections from which the colored layer has been removed.

2. A laser marking method, comprising:

providing a marking sheet including a transparent adhesive layer with good permeability to laser light, a colored layer with good absorption of laser light, and a transparent layer with good permeability to laser light, which is provided on the colored layer, irradiating said marking sheet with laser light to remove prescribed areas of said colored layer to thereby form marked sections, providing a product, a color of an outer surface of said product being different than a color of said colored layer, securing said marking sheet to said outer surface of said product via said adhesive layer, whereby said color of said outer surface can be seen at said marked sections from which the colored layer has been removed.

3. A laser marking method, comprising:

providing a marking sheet including a transparent adhesive layer with good permeability to laser light, a transparent layer with good permeability to laser light, and a colored layer with good absorption of laser light, which is provided on the transparent layer, irradiating said marking sheet with laser light to remove prescribed areas of said colored layer to thereby form marked sections, providing a product, a color of an outer surface of said product being different than a color of said colored layer, securing said marking sheet to said outer surface of said product via said adhesive layer, whereby said color of said outer surface can be seen at said marked sections from which the colored layer has been removed.

4. A laser marking method, comprising:

providing a marking sheet including a colored adhesive layer with good absorption of laser light, a colored layer with good absorption of laser light, and a transparent layer with good permeability to laser light, which is provided on the colored layer, irradiating said marking sheet with laser light to remove prescribed areas of said colored layer and said colored adhesive layer to thereby form marked sections, providing a product, a color of an outer surface of said product being different than a color of said colored layer, securing said marking sheet to said outer surface of said product via said adhesive layer, whereby said color of said outer surface can be seen at said marked sections from which the colored layer has been removed.

5. A marking sheet comprising:

an adhesive layer, a peelable coating sheet layer provided on one side of the adhesive layer, and a colored layer with good absorption of laser light, provided on the other side of said adhesive layer, marked sections being defined on said colored layer by removal of prescribed areas of said colored layer by irradiation with laser light, said marked sections from which the colored layer has been removed being transparent throughout from a front surface of the marking sheet to a back surface thereof.

6. A marking sheet comprising:

a transparent adhesive layer with good permeability to laser light, a peelable coating sheet layer provided on one side of the transparent adhesive layer, a colored layer with good absorption of laser light, provided on the other side of said transparent adhesive layer, and a transparent layer with good permeability to laser light, provided on the colored layer, marked sections being defined on said colored layer by removal of prescribed areas of said colored layer by irradiation with laser light, said marked sections from which the colored layer has been removed being transparent throughout from a front surface of the marking sheet to a back surface thereof.

7. A marking sheet comprising:

a transparent adhesive layer with good permeability to laser light, a peelable coating sheet layer provided on one side of the transparent adhesive layer, a transparent layer with good permeability to laser light, provided on the other side of said transparent adhesive layer, and a colored layer with good absorption of laser light, provided on the transparent layer, marked sections being defined on said colored layer by removal of prescribed areas of said colored layer by irradiation with laser light, said marked sections from which the colored layer has been removed being transparent throughout from a front surface of the marking sheet to a back surface thereof.

8. A marking sheet comprising:

a colored adhesive layer with good absorption of laser light, a peelable coating sheet layer provided on one side of the colored adhesive layer, a colored layer with good absorption of laser light, provided on the other side of said colored adhesive layer, and a transparent layer with good permeability to laser light, provided on the colored layer, marked sections being defined on said colored layer and said colored adhesive layer by removal of prescribed areas of said colored layer by irradiation with laser light, said marked sections from which the colored layer has been removed being transparent throughout from a front surface of the marking sheet to a back surface thereof.

9. A marking sheet-equipped product, comprising, in combination, a product and a marking sheet applied to an outer surface of said product, said marking sheet including, an adhesive layer and a colored layer with good absorption of laser light, marked sections being defined on said colored layer by removal of prescribed areas of said colored layer by irradiation with laser light, said marked sections from which the colored layer has been removed being transparent throughout from a front surface of the marking sheet to a back surface thereof, wherein said marking sheet is pasted on the outer surface of the product via said adhesive layer, whereby a color of the outer surface of the product can be seen through said marked sections.

* * * * *